United States Patent
Rahy et al.

(10) Patent No.: US 10,793,770 B2
(45) Date of Patent: Oct. 6, 2020

(54) ENHANCED PROPPANT TRANSPORT FOR HYDRAULIC FRACTURING

(71) Applicant: Univar USA Inc., Downers Grove, IL (US)

(72) Inventors: Abdelaziz Rahy, Waxahachie, TX (US); DeWitt Knox, Mansfield, TX (US); Mohand Melbouci, Wilmington, DE (US); Christopher Alameddin, Denver, CO (US); Joel F. Siegel, Denver, CO (US); Benjamin J. Poppel, Westminster, CO (US); Leendert Weijers, Greenwood Village, CO (US); Ronald Gusek, Denver, CO (US)

(*) Notice: Subject to any disclaimer, the term of this patent is extended or adjusted under 35 U.S.C. 154(b) by 28 days.

(21) Appl. No.: 15/735,178

(22) PCT Filed: Jun. 13, 2016

(86) PCT No.: PCT/US2016/037270
§ 371 (c)(1),
(2) Date: Dec. 9, 2017

(87) PCT Pub. No.: WO2016/201445
PCT Pub. Date: Dec. 15, 2016

(65) Prior Publication Data
US 2018/0155615 A1     Jun. 7, 2018

Related U.S. Application Data

(60) Provisional application No. 62/174,883, filed on Jun. 12, 2015.

(51) Int. Cl.
| | | |
|---|---|---|
| C09K 8/90 | (2006.01) | |
| C09K 8/80 | (2006.01) | |
| E21B 43/00 | (2006.01) | |
| C08B 37/14 | (2006.01) | |
| C09K 8/88 | (2006.01) | |
| C09K 8/92 | (2006.01) | |
| C08L 33/26 | (2006.01) | |
| C08L 5/00 | (2006.01) | |
| E21B 43/267 | (2006.01) | |

(52) U.S. Cl.
CPC ............ *C09K 8/90* (2013.01); *C08B 37/14* (2013.01); *C08L 5/00* (2013.01); *C08L 33/26* (2013.01); *C09K 8/80* (2013.01); *C09K 8/882* (2013.01); *C09K 8/887* (2013.01); *E21B 43/00* (2013.01); *C09K 8/92* (2013.01); *C09K 2208/28* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 3,658,734 A | 4/1972 | Pettitt | |
| 4,374,216 A | 2/1983 | Dammann | |
| 4,425,241 A | 1/1984 | Swanson | |
| 4,881,566 A * | 11/1989 | Ubels ................ | C09K 8/68 137/13 |

(Continued)

*Primary Examiner* — John J Figueroa
(74) *Attorney, Agent, or Firm* — Barnes & Thornburg LLP

(57) ABSTRACT

A dry composition of dry polyacrylamide and dry guar; or a liquid suspension made from the dry composition for treating subterranean formations and methods for enhancing proppant transport in fracturing fluids using the composition.

15 Claims, 3 Drawing Sheets

(56) References Cited

U.S. PATENT DOCUMENTS

| | | |
|---|---|---|
| 7,351,680 B2 | 4/2008 | Hayes |
| 7,857,055 B2 | 12/2010 | Li |
| 8,043,999 B2 | 10/2011 | Sullivan et al. |
| 8,044,000 B2 | 10/2011 | Sullivan et al. |
| 2006/0058198 A1 | 3/2006 | Dessinges et al. |
| 2009/0145607 A1 | 6/2009 | Li |
| 2012/0157356 A1 | 6/2012 | Dawson et al. |
| 2014/0054042 A1* | 2/2014 | Pich .................. E21B 43/26 166/308.2 |
| 2014/0121134 A1 | 5/2014 | Kuri et al. |
| 2014/0158355 A1 | 6/2014 | Wuthrich et al. |
| 2014/0332213 A1 | 11/2014 | Zhou et al. |

* cited by examiner

ENHANCED PROPPANT TRANSPORT FOR HYDRAULIC FRACTURING

BACKGROUND OF THE INVENTION

Field of the Invention

This application relates generally to compositions and methods for recovery of hydrocarbons from subterranean formations.

Description of Related Art

Hydraulic fracturing techniques are widely used to stimulate oil and gas production from low permeability reservoirs. During hydraulic fracturing, a fluid is injected into a wellbore under high pressure causing fractures to open around the wellbore and into the subterranean formation. Often a proppant, such as sand, is included in the fracturing fluid to keep the fractures open when the treatment is complete. Ideally, hydraulic fracturing creates high conductivity communication with a large area of the formation allowing for an increased rate of oil or gas production.

Slickwater fracturing is a type of hydraulic fracturing that uses a low viscosity aqueous fluid to induce the subterranean fracture. Slickwater fluids are basically fresh water or brine having sufficient friction reducing agent to minimize the tubular friction pressures. Such fluids, generally, have viscosities only slightly higher than unadulterated fresh water or brine. Typically, the friction reduction agents present in slickwater do not increase the viscosity of the fracturing fluid by more than one to two centipoise (cP).

Slickwater fluids often contain proppants. In light of the low viscosity of the fluid, its proppant-carrying capacity is lower than that of the crosslinked polymer gels used for non-slickwater fracturing. A lower concentration of proppant requires a higher volume of fracturing fluid to place a sufficient amount of the proppant into the induced fractures. Proppant settling from low viscosity fracturing fluids within the horizontal section of the wellbore, the manifold lines, and the pump is also a concern. Excessive proppant settling within a horizontal wellbore can necessitate cessation of fracturing treatments prior to placement of the desired volumes. The proppant may also settle in the manifold lines before it even reaches the wellhead. The proppant may even settle in the pump, damaging the pistons. This is particularly a problem when the proppant is composed of high compressive strength, such as ceramics. Typically settling occurs as a result of insufficient slurry flow velocity and/or insufficient viscosity to suspend the proppant. In order to mitigate settling issues, high pumping rates are employed to effectively suspend the proppant for transport. However, high pumping rates can result in higher than desirable pumping pressures and excessive fracture height growth. Further, since manifolds have different dimensions, mere modification of pump rate for the fluid in one area may not address the problem in another. Because of the large quantities of fracturing fluid needed, the high velocity of the fluid flow, and the irregularities of the subterranean formation, energy loss from friction can often prevent effective fracturing of the formation.

The flow of a fluid through a conduit induces frictional energy losses. The pressure of the liquid in the conduit decreases in the direction of the fluid flow. For a conduit with a fixed diameter, this drop in pressure increases with an increasing flow rate. The pressure decrease signifies the loss of energy. Slickwater fracturing relies on high pump rates typically above 100 bpm (barrels per minute); hence a large amount of energy is lost due to the friction between the conduit and fracturing fluid.

In rheology, the Reynolds number is a dimensionless ratio of the inertial forces to the viscous forces of a fluid under flow conditions. The Reynolds number can be used to characterize the fluid flow as laminar or turbulent. Laminar flow occurs when the viscous forces dominate the inertial forces resulting in a low Reynolds number. Turbulent flow occurs when the inertial forces dominate the viscous forces resulting in a high Reynolds number. Laminar flow occurs when the fluid flows in parallel sheets or coaxial layers with little mixing between the layers. Turbulent flow is the opposite of laminar flow and occurs when there are cross-currents perpendicular to the flow of the fluid giving rise to lateral mixing and eddies.

Generally, high molecular weight linear polymers are used to alter the rheological properties of the fluid so that the turbulent flow is minimized, thereby preventing consequent energy loss in the fluid as it is pumped through the pipe. A good friction reducer will cause a large decrease in friction at small concentrations, will be inexpensive, will be environmentally friendly, and will have high shear, temperature and pressure stability.

The most common friction reducers are polyacrylamide (PAM) polymers, available as emulsions or in granular forms. Various copolymers have also been developed to further enhance the performance of a polyacrylamide friction reducer. Sodium acrylamido-2-methylpropane sulfonate (sodium AMPS) and acrylic acid are common monomers besides the acrylamide in these copolymers to improve the hydration of the friction reducers.

Often there is difficulty in handling such high molecular weight dry/granular polymers because of their low rate of hydration and high viscosity when made into a stock solution. To circumvent these problems, the polyacrylamide-based polymer is often made as an emulsion, where the polymer is dispersed in a hydrocarbon solvent, such as mineral oil, and stabilized with surfactants. Hydraulic fracturing fluids may contain the aforementioned polyacrylamide-based polymer emulsions and can also contain polymeric viscosifiers such as guar gum added separately as disclosed in U.S. Pat. Nos. 3,658,734; 4,374,216; 4,425,241; 7,857,055; 8,043,999; 8,044,000 and in U.S. Patent Publication No. 2014/0158355.

Another approach is to use dry pre-mixtures of additives which are then converted into a liquid just before injection into the wellbore. Examples include use of a dry blend of a polymer such as guar and additives disclosed in U.S. Patent Publication No. 2006/0058198; and use of dry polyacrylamide for drilling fluid compositions disclosed in U.S. Pat. No. 7,351,680; U.S. Patent Publication No. 2012/0157356 and U.S. Patent Publication No. 2014/0121134.

Hydraulic fracturing has been a boon to the oil and gas industry. Many oil and gas wells have been made more productive due to the procedure. However, the hydraulic fracturing business is now facing increased scrutiny and governmental regulation. The industry is responding by searching for more effective chemicals to put into their hydraulic fracturing fluids.

In addition, large volumes of water are required for hydraulic fracturing operations. Fresh water may be a limiting factor in some areas. A slickwater fracturing composition that can use a variety of water sources, such as produced water from the formation or flowback water after a well treatment, could significantly enhance the field applicability.

There is an ongoing need to develop slickwater fracturing fluids that have even more effective friction reduction to minimize the energy loss but yet have sufficient viscosity for proppant-carrying capacity while being safe and environmentally friendly.

BRIEF SUMMARY OF THE INVENTION

The present invention is related to a dry blend composition of synthetic and naturally derived polymers for use in hydraulic fracturing, particularly in slickwater fluids. The blend composition can also be made available as a high activity solvent based fluidized polymer suspension. Either in dry or liquid forms, the blend composition thereof provides higher proppant carrying capacity in comparison to conventional solutions, as well as improved breakability and crosslinking capacity.

DETAILED DESCRIPTION OF THE INVENTION

Figure 1:
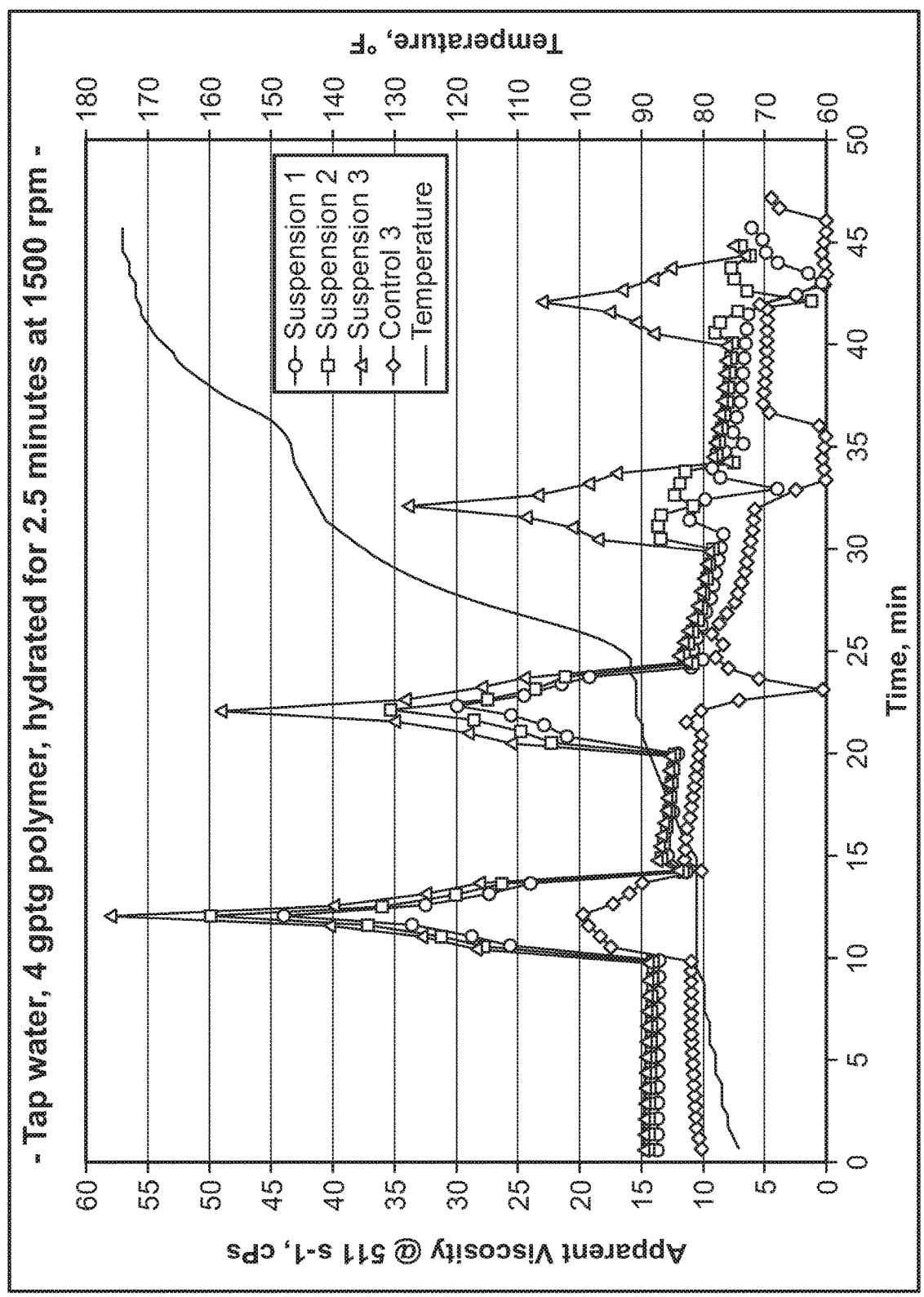
FIG. 1 is a graph comparing polymer shear sweeps for suspensions 1-3 and control 3 at atmospheric pressure and temperature ranging from ambient to 180° F.

The fracturing fluid may contain one or more types of proppant. Suitable proppants include those conventionally known in the art including quartz, sand grains, glass beads, aluminum pellets, ceramics, resin coated ceramics, plastic beads, nylon beads or pellets, resin coated sands, sintered bauxite and resin-coated sintered bauxite.

The composition of the present invention includes at least one naturally-derived polymer. Naturally-derived polymers occur in nature and can be extracted or chemically modified to improve functionality. They are often water-based polysaccharides. In one embodiment, the naturally derived polymer may be cellulose or starch, or guar and derivatives thereof. In one embodiment, the naturally derived polymer is a guar source. In accordance with the principles of the invention, the guar source may include any grade of guar gum. In an aspect, the guar source may be guar pod harvested from the endosperm of leguminous seeds. Typically the guar source may be the endosperm, also called the guar split, which constitutes approximately 30-40% of the seed. The guar source may further be derived from the remainder of the seed, referred to as the hull (approximately 15%) and the inner germ (approximately 45%). For instance, the guar source may be the refined guar split, which is the polished fibrous layers that are removed from the husk. The guar source may further be guar gum that is produced from refined guar split by softening, flaking, pulverizing and sieving.

In an aspect, guar is in a powder form. Typically, powders having a size of between about 60 mesh and about 400 mesh, more typically between about 100 to 325 mesh. The guar may have a particle size below 500 μm (micron), preferably below 300 μm and most preferably below 200 μm.

Suitable guar derivatives include carboxyalkyl guars and hydroxyalkyl guars. Preferred are carboxymethyl guar, hydroxypropyl guar, hydroxyethyl guar, hydroxybutyl guar and carboxymethylhydryoxypropyl guar. Preferably the hydroxyalkylated guar has a molecular weight of about 1 to about 3 million. In an aspect, the degree of substitution of the carboxylated guar is typically between from about 0.08 to about 0.18. In an aspect, hydroxypropyl content of the hydroxyalkylated guar is typically between from about 0.2 to about 0.6.

The carboxyalkyl guar can be obtained in many ways, including a) using premium grade guar as the starting material to which the anionic groups are chemically added; and/or b) selecting processing parameters that provide better uniformity in placing the anionic substituent on the guar polymer backbone; and/or c) additional processing steps, including ultrawashing to remove impurities and refine the polymer. Preferred polymers include those guars having randomly distributed carboxymethyl groups.

Guar derivatives may also be suitable for the dry compositions of the present invention. In an embodiment, guar may be chemically modified to produce guar derivatives such as hydroxypropyl guar, carboxymethyl guar, carboxymethyl Hydroxypropyl guar and cationic guar.

Naturally-derived cellulosic derivatives suitable for use include carboxymethyl cellulose, hydroxyethyl cellulose and carboxymethyl hydroxyethyl cellulose; while naturally-derived starch derivatives suitable for use include carboxymethyl starch and hydroxyethyl starch.

Without limitation, useful polysaccharides for the practice of this invention may have average molecular weights typically in the range of from about 200,000 to about 3,000,000.

In another aspect, the preferred guar, guar derivatives and cellulose derivatives have a solution viscosity of at least 3,500 cP (centipoise); preferably from about 4,000 to about 5,000 cP and most preferably higher than 5,000 cP at 1%.

The composition of the present invention includes at least one synthetic friction reducer. The synthetic friction reducer may be a water-dispersable acrylamide polymer or polyethylene oxide. It has been discovered that the acrylamide polymer enhances a fluid's high temperature endurance. The acrylamide polymer may be a homopolymer or a copolymer of acrylamide monomers with one or more different monomers. As used herein, the term homopolymer is meant to encompass polymers having less than about 0.1% by weight of any other monomers. The acrylamide homopolymer is a non-ionic polymer made of acrylamide monomers. With respect to the acrylamide copolymers, the other non-acrylamide monomers may be selected to provide the acrylamide polymer ionic properties. For example, in the acrylamide-acrylate copolymer, the acrylate segments are anionic. Examples of suitable non-acrylamide monomers include acrylate monomers, such as sodium acrylate, potassium acrylate and ammonium acrylate. Examples of acrylamide copolymers also include acrylamido methylpropane sulfonate (AMPS)-acrylamide copolymer. The copolymers may be block or random copolymers. The non-acrylamide monomers may make up from about 0.1% to up to about 50% or more of the copolymer, more particularly from about 5% to about 15%. Acrylamide-acrylate copolymers may also be formed by hydrolysis of an acrylamide homopolymer typically conducted with heat under alkaline reaction conditions. As used herein, the expression "polyacrylamide" or "acrylamide polymer" are meant to include both acrylamide homopolymers and copolymers of acrylamide with other monomers unless stated otherwise or as is apparent from the context.

The polyacrylamide may have a weight average molecular weight of from greater than about 2 million; preferably greater than about 5 million; and more preferably greater than about 15 million. The polyacrylamide may be used in the fluids of the invention in an amount of from about 0.1% to about 5% by weight of the fluid. In certain applications, the polyacrylamide may be used in an amount of from about 0.03% to about 0.4% by weight of the fluid. The polyacrylamide may be added in liquid form, such as dispersed in mineral oil, glycol, water, or other carrier. The polyacrylamide may also be added in solid or particulate form.

In an embodiment, the synthetic friction reducer is polyethylene oxide. Polyethylene oxide (PEO) is a straight-chained, high molecular weight polymer. The weight average molecular weight of the polyethylene oxide is between from about 1 million to about 20 million, more preferably between from about 2 million to about 10 million. Typically the amount of PEO in the fracturing fluid is between from about 10 ppm to about 400 ppm, more typically between from about 20 ppm to about 100 ppm.

Typically the weight ratio of naturally-derived polymer to synthetic friction reducer in the dry composition is between from about 3:1 to about 1:3; more typically between from about 2:1 to about 1:1.

Previous attempts to combine guar or guar slurry with standard polyacrylamide emulsions have not produced satisfying results. Conventionally, the guar polymer would hydrate in the emulsion package of polyacrylamide and form a pasty mixture; or attempts to blend guar powder with standard granular polyacrylamide friction reducer were unsuccessful because the particle size and density difference between the naturally derived polymer and synthetic friction reducer did not produce a homogeneous blend. Instead, separation of the components occurred.

By contrast, it has been discovered that when polyacrylamide is ground to a given particle size distribution, below 500 μm, preferably below 300 μm and most preferably below 200 μm; homogeneity issues are resolved. The dry composition of the present invention can be put into suspension at very high solids content with no hydration issues.

One advantage of the composition is that it may be more easily stored and transported to a well site. In addition, preparation of the fracturing fluid is simplified, as the dry composition delivers two constituents in a single form, thereby reducing the number of additive streams into a fracturing fluid. Furthermore, the number of operations on location is reduced due to the reduced number of streams. The dry composition also provides a reduction in volume and weight of the treatment as compared to additives in liquid form.

Another advantage of the dry composition is stability. It is not subject to freezing, thereby facilitating use in colder climates. In addition, the concentration of the components in the dry composition will not change due to evaporation of solvent, which is particularly beneficial for oilfields in warmer climates.

Still another advantage of the dry composition is improved activity in terms of crosslinkability, proppant loading, viscosity and breakability. Crosslinking activity, particularly for zirconium and titanium crosslinkers, has been shown to decrease with time in solution. The dry composition of the present invention reduces the time that the crosslinker is in solution prior to being combined with the two polymers, thereby maintaining a higher and more consistent level of activity.

A cross-linking agent may be used with the fluids. The cross-linking agents used include boron or Group IV transition metal compound cross-linking agents. The cross-linking agent may include zirconium, titanium and hafnium cross-linking agents and combinations thereof and may include organometallic compounds. In particular, boron, organo-zirconium and titanium crosslinking agents are useful. The cross-linking agent may be included in the fluid in an amount of from about 0.1% to about 1.5% by weight of the fluid, more particularly from about 0.01% to about 1.5% by weight of the fluid, more particularly, from about 0.02% to about 0.3% by weight of the fluid.

The fracturing fluid may also contain other conventional additives common to the well service industry such as corrosion inhibitors, surfactants, demulsifying agents, scale inhibitors, asphaltene inhibitors, paraffin inhibitors, gas hydrate inhibitors, dispersants, oxygen scavengers, biocides and the like.

Suitable surfactants will act as surface active agents and function as emulsifiers, dispersants, foamers or defoamers. In some embodiments of the invention, the surfactant is an anionic surfactant. Examples of suitable anionic surfactants include, but are not limited to, anionic surfactants such as alkyl carboxylates, alkyl ether carboxylates, alkyl sulfates, alkyl ether sulfates, alkyl sulfonates, alpha olefin sulfonates, alkyl phosphates and alkyl ether phosphates. Examples of suitable anionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates.

The compositions of the present invention are suitable for use in fresh water, brackish water and hard brine environments.

Conventionally, proppant loading for slickwater treatment is only up to 2 ppa (pounds of proppant added). However, with the present invention, a proppant loading of at least about 3 ppa can be achieved. In an aspect, the amount of proppant in the fracturing fluid may even be greater than about 4 ppa.

Moreover, in conventional slickwater treatments, the liquid suspension made from the dry composition of the present invention for treating the wellbore has a viscosity only up to about 12 cPs at 4 pptg (pounds per thousand gallons) polymer loading. With the composition of the present invention, viscosity of greater than about 13 cP can be obtained. In an aspect, viscosity greater than about 15 cP can be obtained. The increase in viscosity is desirable for providing higher carrying/suspending capacity. The higher the viscosity, the more proppant can be suspended in the liquid, particularly under laminar flow conditions.

Example 1

It was discovered that stable high polymer active content suspensions in mineral oil could be prepared with combined polymers to deliver multifunctional properties. The suspension composition of this invention consists of benzene, toluene and xylene-free mineral oil, organophilic clay, surfactant and a combination of powdered guar gum and polyacrylamide polymers. Table 1 provides the compositions of the suspensions tested.

TABLE 1

Detailed Suspensions Composition

| Ingredients | Suspension 1 | Suspension 2 | Suspension 3 |
|---|---|---|---|
| Mineral Oil | 45.5 | 45.5 | 45.5 |
| Organophilic clay | 2 | 2 | 2 |
| Surfactant 1 | 0.5 | 0.5 | 0.5 |
| Surfactant 2 | 2 | 2 | 2 |
| Dry fine powder Polyacrylamide | 25 | 30 | 37.5 |
| Guar gum | 25 | 20 | 12.5 |

The suspension examples were prepared with SHELL-SOL D80 mineral oil available from Shell Chemicals; surfactant 1 (TDA-9, C-13 alcohol ethoxylate available from Sasol); surfactant 2 (LUMISORB, a sorbitan sesqueoleate available from Lambent Technologies); organophilic clay (CCOC 882, available from Imperial Group); dry polyacrylamide (FLOJET AN943VHV, available from SNF); and guar (35-45 cPs grade). The suspension is prepared by adding the organophilic clay into the oil while mixing, followed by addition of the surfactants. Then the polymer blend of guar and polyacrylamide is added to the mixture and homogenized.

The hydration profile of the various suspensions was assessed by means of "linear gel viscosity at 3 min mark after the polymer addition", corresponding to the hydration of the polymer after mixing in a WARING blender for 2.5 minutes at 1500 rpm and stabilization on a Grace 3600 viscometer set at 300 rpm for 30 seconds. The evaluation was conducted in tap water at 4.0 gptg (gallons per thousand gallons) polymer and viscosity measured at 3 minute mark after the initial addition (0.5 minutes following the 2.5 minutes of mixing). The hydration profiles are illustrated by the viscosity data in Table 2.

Example 2

For this evaluation, suspension examples representative of the composition of this invention were compared to commercially available polyacrylamide emulsions-based friction reducers.

Figure 2:
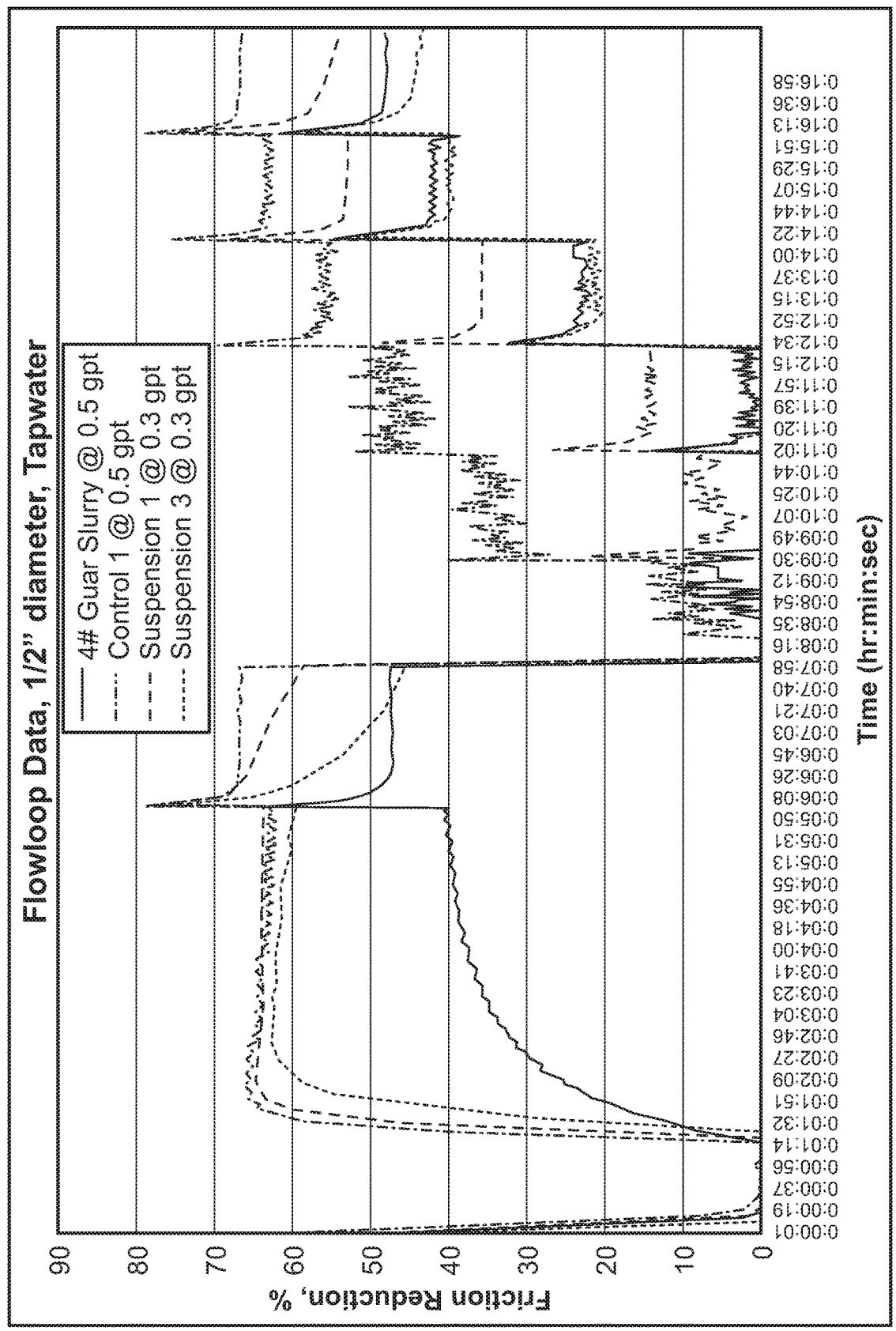
FIG. 2 is a graph comparing friction reduction for suspensions 1 and 3, control 1 and guar in tap water.

Data in Table 2 indicates clearly that the suspensions of this invention synthesized as described in Example 1 provide much higher linear gel viscosity than conventional compositions. Controls 1-3 are anionic polyacrylamide based friction reducers commercially available. Furthermore, the suspensions of this invention do not require any particular hydration equipment to achieve such high viscosities. The highest viscosity is achieved with a combination of 50/50 of guar/polyacrylamide combination. Suspensions 1 and 3 were evaluated for their friction reduction capacity. Results in FIG. 2 also show that fast hydration and good friction reduction levels were achieved with lower loadings (0.3 gptg) vs current solutions at 0.5 gptg. As expected, the low loading (0.30 gptg) is causing an increase in shear out, the suspension 1 is much better for both inversion/hydration rate and max percent of friction reduction.

TABLE 2

Comparative Linear Gel Viscosity Profile in Tapwater

| Ingredients | Suspension 1 | Suspension 2 | Suspension 3 | Control 1 | Control 2 | Control 3 |
|---|---|---|---|---|---|---|
| 3 min apparent viscosity @ 511 s$^{-1}$, cP (4 gptg, 2.5 min hydration @ 1500 rpm) | 17 | 16.4 | 14.7 | 11.9 | 9.2 | 10.1 |

Example 3a

The comparative samples were further tested for their crosslinking capacity. The gel solutions of Table 2 were crosslinked with 2 gptg BXL-411 instant and self-buffered boron crosslinker, available from Univar Inc.

Figure 3:
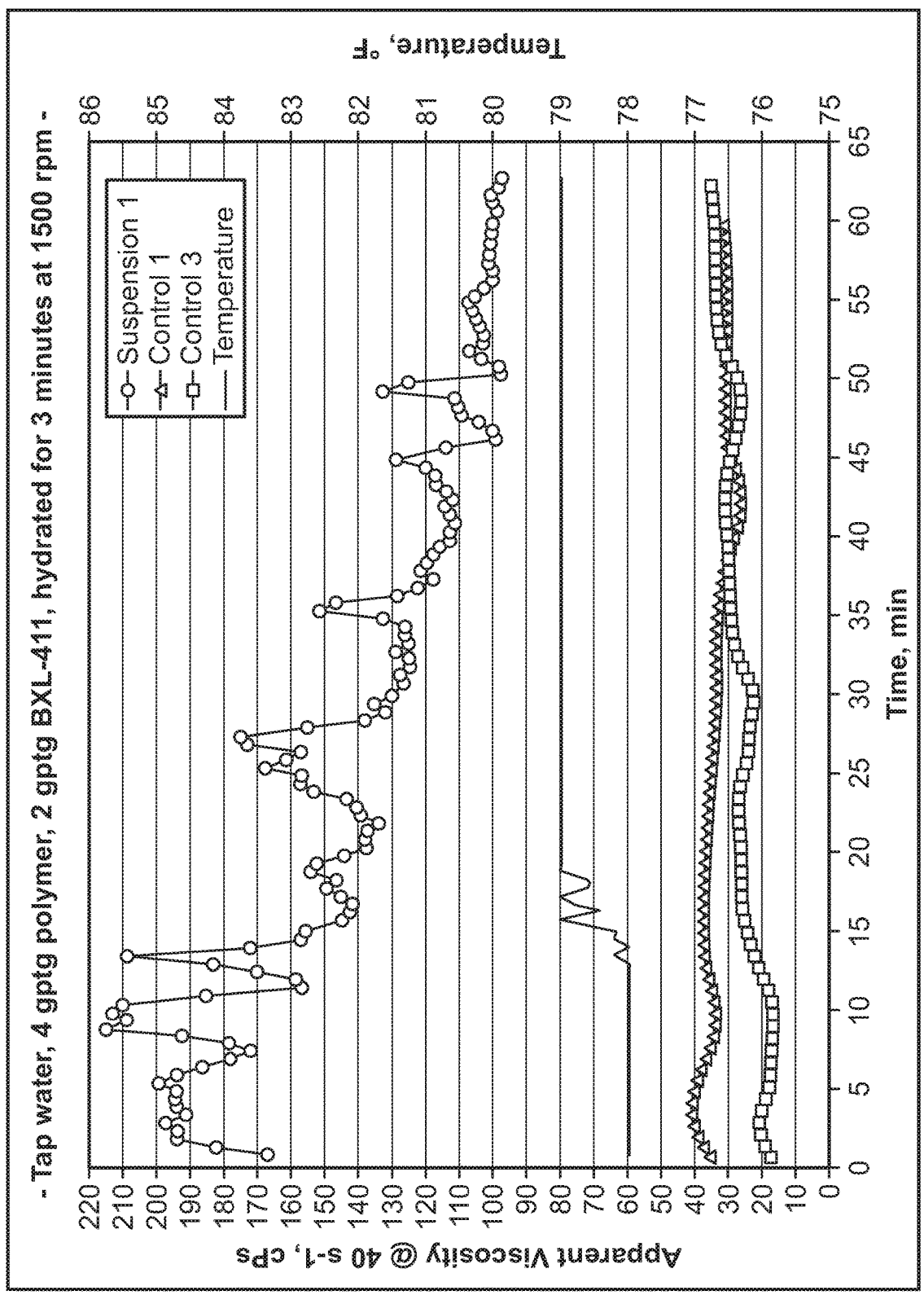
FIG. 3 is a graph comparing crosslinked viscosity for suspension 1, control 1 and control 3 at ambient temperature.

The gels made with the suspensions 1-3 of this invention produced strong and lipping gel, while gels with controls 1-3 did not crosslink. Results in FIG. 3 show comparative crosslinked viscosities at ambient temperature on Grace 5600 HPHT viscometer. It is clear that superior crosslinking capacity of suspension 1 in comparison to controls 1 and 3, conventional synthetic friction reducers. The controls did not crosslink, while suspension 1 achieves initial viscosity of about 200 cP, which remained above 100 cP after one hour. This indicates that this invention provides multiple functionalities that would allow enhanced proppant transport and placement.

Furthermore, after hydration, the gel solutions (4 pptg of suspensions 1-3) were subject to API shear sweeps (method RP 39). After a baseline viscosity was observed for 10 minutes at ambient temperature, a shear sweep was performed, followed by raising the gel temperature to 90° F., 145° F., and 175° F., with shear sweeps performed once the test temperature was reached. The resulting data (FIG. 1) indicate to what degree the fluids remained non-Newtonian as the temperature increased. Some thermal thinning of the fluid takes place, but it is important to highlight the fact that all the three suspensions fully hydrate with no particular hydration equipment or conditions.

Example 3b

Crosslinking capacity of the compositions was also tested under high temperature conditions. A gel of suspension 1 was prepared as described in Example 1, with a concentration of 25 pounds polymer blend/1000 gallons fracturing fluid. These gels were then buffered to a pH of 9-10 and cross-linked with a high pH buffer, surface and delayed boron crosslinkers available from Univar (BES-y and BXL-411).

The fluid viscosity was then measured using a Grace 5600 HTHP viscometer. The temperature was ramped from ambient to 180° F. over a period of ten minutes. Shear was measured at 100/s with periodic API (American Petroleum Society) shear sweeps. The gel produced was a strong lipping gel with a consistent viscosity over 100 cP at 180° F. Control fluids did not gel with the addition of buffer and cross-linker. API shear sweeps indicated an average n'=0.55 and K'=2.72 (both showing strong non-Newtonian behavior at high temperature). Control fluids yielded n'>1 above 130° F. and K'<0.7. These results provided in Table 3 below indicate increased proppant carrying capacity.

TABLE 3

High Temperature Crosslinking Capacity

| Shear Ramp | Cycle No. | Time (min) | Temp. (° F.) | n' | Kv (lbf-s^n/ 100 ft²) | Coefficient Determination (R ^2) | K' (lbf-s^n/ 100 ft²) | K'Slot (lbf-s^n/ 100 ft²) | Visc. at 40 (1/s) cP | Visc. at 100 (1/s) cP | Visc. at 170 (1/s) cP |
|---|---|---|---|---|---|---|---|---|---|---|---|
| 1 | 1 | 13.7 | 183 | 0.6252755 | 1.319125 | 0.836 | 1.2596 | 1.401232 | 186.36 | 135.57 | 112.76 |
| 2 | 1 | 23.7 | 182 | 0.533543 | 2.658727 | 0.658 | 2.500145 | 2.86566 | 245.52 | 160.13 | 125.02 |
| 3 | 1 | 33.7 | 180 | 0.54435 | 2.436904 | 0.743 | 2.294692 | 2.623631 | 233.93 | 154.08 | 120.99 |
| 4 | 1 | 43.7 | 179 | 0.443515 | 3.951964 | 0.894 | 3.674958 | 4.29097 | 263.75 | 158.39 | 117.9 |
| 5 | 1 | 53.7 | 179 | 0.730751 | 0.957225 | 0.674 | 0.923426 | 1.004999 | 178.22 | 139.26 | 120.72 |
| 6 | 1 | 63.7 | 179 | 0.41797 | 3.828364 | 0.82 | 3.549101 | 4.162276 | 232.83 | 136.59 | 100.3 | lbf = pounds-force
visc. = viscosity
n = power law index
K = consistency

Example 4

The yield point and plastic viscosity of the suspensions were also tested. Comparative gels were made as described in Example 1, with three blends of the inventive compositions (70/30, 65/35, 60/40 guar/friction reducer) as well as conventional treatments of xanthan or guar gum. Xanthan is known for its capacity to suspend proppant and cuttings at very low shear rate, as indicated by the yield point. Samples were tested for linear gel viscosity using a Fann 35-type viscometer at ambient temperatures, at 300 and 600 rpm. These results provided in Table 4 below are useful in calculating fluid yield point and plastic viscosity. The yield point and plastic viscosity of the compositions was calculated to be 6-8 pounds/100 feet and 6-7 cP, where guar alone or xanthan alone each gave 3-5 pounds/100 feet and 5-6 cP.

TABLE 4

Yield Points and Plastic Viscosity

| 15 # Hydrations | | 300 rpm | 600 rpm | Plastic Viscosity | Yield Point |
|---|---|---|---|---|---|
| Guar | Reading | 7.8 cP | 6.3 cP | 5 cP | 3 lb/100 ft² |
|  | Dial | 8 | 13 |  |  |
| Xanthan | Reading | 11.5 cP | 8.3 cP | 6 cP | 5 lb/100 ft² |
|  | Dial | 11 | 17 |  |  |
| FR Visc. (60/40) | Reading | 13.9 cP | 10.3 cP | 7 cP | 7 lb/100 ft² |
|  | Dial | 14 | 21 |  |  |
| FR Visc. (65/35) | Reading | 13.5 cP | 10.0 cP | 6 cP | 8 lb/100 ft² |
|  | Dial | 14 | 20 |  |  |
| FR Visc. (70/30) | Reading | 13.1 cP | 9.8 cP | 7 cP | 6 lb/100 ft² |
|  | Dial | 13 | 20 |  |  |

FR Visc. = friction reducer viscosity

Example 5

The compositions' tolerance to salt was also measured. Comparative samples were prepared as in Example 1, with the addition of a given amount of various salts representative of oilfield conditions. After hydration, the fluid viscosity was measured at ambient temperature using a Fann 35-type viscometer at 511/s. As provided in Table 5 below, the inventive compositions showed the highest tolerance to two of three brines tested.

TABLE 5

Viscosity Differences

| Fluid | GPT | visc., cP @ 511/s tap water | Percent 2000 mg/l NaSO₄ | Difference in 3.5% NaCl | Viscosity 1% CaCl₂ |
|---|---|---|---|---|---|
| A | 3.0 | 12 | −30% | −57% | −83% |
| A | 5.0 | 20 | −35% | −59% | −87% |
| A | 3.0 | 5.4 | 0% | −33% | −59% |
| A | 5.0 | 9.4 | −11% | −45% | −66% |
| 60/40 | 3.0 | 11.8 | −14% | −22% | −47% |
| 60/40 | 5.0 | 21.6 | −9% | −23% | −46% |

Fluid A = conventional friction reducer
GPT = gallon per thousand gallons

Example 6

The comparative crosslinked samples may be further evaluated for their breakability. To a gel solution, 0.75-2.0 gptg standard breaker (enzyme, acid or oxidizer) would be added. The viscosity reduction profile would be followed over time. It is anticipated that the solution viscosity of the solutions prepared with suspensions 1 to 3 of the present invention would show a higher viscosity reduction ratio as compared to controls 1 to 3.

Example 7

The comparative gel solutions (which may or may not be crosslinked) may be further evaluated for the capacity to increase proppant carrying capacity. The proppant carrying capacity may be assessed by means of static settling of various amounts of proppant in various gel solutions over a period of time and compared side by side with the incumbent controls. It is anticipated that gel solutions made with suspensions 1 to 3 would exhibit lower proppant settling rates in comparison to controls 1 to 3. It is further anticipated that the gel solutions of suspensions 1 to 3 would tolerate and suspend higher proppant loading (3-4 ppa (pounds of proppant added)) in comparison to controls 1 to 3 that are anticipated to be limited to no more than 2 ppa.

For the present invention, each numerical value should be read once as modified by the term "about" (unless already expressly so modified), and then read again as not so modified unless otherwise indicated in context. Concentration ranges listed or described herein include any and every concentration within the range, including the endpoints. For example, "a range of from 1 to 10" is to be read as indicating each and every possible number along the continuum between about 1 and about 10. Thus, even if specific data points within the range, or even no data points within the range, are explicitly identified, it is to be understood that inventors appreciate and understand that all data points within the range are considered to have been specified, and the inventors have disclosed and enabled the entire range and all points within the range.

It is understood that modifications to the invention may be made as might occur to one skilled in the field of the invention within the scope of the appended claims. All embodiments contemplated hereunder which achieve the objects of the invention have not been shown in compete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

We claim:

1. A method for enhancing proppant transport in fracturing fluids for hydraulic fracturing comprising the steps of:
   a) combining from 10-90% by weight of a dry naturally-derived polymer having a particle size below 500 μm and from 10-90% by weight of dry synthetic friction reducer having a particle size below 500 μm to form a dry friction reducing composition;
   b) forming a liquid suspension from said dry friction reducing composition by adding said at least 20 percent by weight of said composition to a liquid carrier, the liquid carrier comprising mineral oil;
   c) introducing said liquid suspension into a hydraulic fracturing fluid to form a treated hydraulic fracturing fluid;
   d) adding said treated hydraulic fracturing fluid to a wellbore having a hole in a subterranean formation and
   e) pumping said treated hydraulic fracturing fluid down said hole to frac said wellbore;
wherein said treated hydraulic fracturing fluid carries a minimum of 3 ppa proppant, is more crosslinkable and has a higher breakability.

2. The method of claim 1 wherein said liquid carrier further comprises glycol.

3. The method of claim 1 wherein said synthetic friction reducer is a water-soluble polymer.

4. The method of claim 3 wherein said water-soluble polymer is selected from the group consisting of polyacrylamide, polyethylene oxide and combinations thereof.

5. The method of claim 1 wherein said naturally-derived polymer is selected from the group consisting of guar, guar derivatives, cellulose derivatives and combinations thereof.

6. The method of claim 1 wherein said naturally-derived polymer is guar and said synthetic friction reducer is polyacrylamide fine powder having a particle size below 200 μm.

7. The method of claim 1 wherein said liquid suspension further comprises a cross-linking agent.

8. The method of claim 1 wherein said liquid suspension has a minimum linear gel viscosity of 15 cP at 4 pptg polymer loading.

9. The method of claim 1 wherein the fracturing fluid is slickwater formed from additives selected from the group consisting of polyacrylamide, polyethylene oxide, guar, cellulosics and combinations thereof.

10. The method of claim 6 wherein the range of guar to polyacrylamide of said dry friction reducing composition is in the range of 10% to 90% by weight to 90% to 10% by weight.

11. The composition of claim 1, wherein the liquid suspension further comprises an organophilic clay.

12. The composition of claim 1, wherein the liquid suspension further comprises surfactant.

13. A method for increasing the efficiency of a polyacrylamide additive in slickwater fracturing comprising the steps of:
   a) combining dry polyacrylamide fine powder having a particle size below 500 μm with dry guar having a particle size below 500 μm to form an additive composition to form a dry friction reducing composition;
   b) forming a liquid suspension from said dry friction reducing composition by adding said at least 20 percent by weight of said composition to a liquid carrier, the liquid carrier comprising mineral oil;
   c) introducing said liquid suspension into a hydraulic fracturing fluid to form a treated hydraulic fracturing fluid;
   d) adding said treated hydraulic fracturing fluid to a wellbore having a hole in a subterranean formation and
   e) pumping said treated hydraulic fracturing fluid down said hole to frac said wellbore;
wherein said treated hydraulic fracturing fluid carries a minimum of 3 ppa proppant, is more crosslinkable and has a higher breakability.

14. The method of claim 13, wherein the liquid suspension further comprises an organophilic clay.

15. The method of claim 13, wherein the liquid suspension further comprises surfactant.

* * * * *